(12) United States Patent (10) Patent No.: US 8,621,572 B2
Wang et al. (45) Date of Patent: Dec. 31, 2013

(54) METHOD, APPARATUS AND SYSTEM FOR UPDATING AUTHENTICATION, AUTHORIZATION AND ACCOUNTING SESSION

(75) Inventors: Yungui Wang, Nanjing (CN); Jinwei Xia, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/406,110

(22) Filed: Feb. 27, 2012

(65) Prior Publication Data

US 2012/0159576 A1    Jun. 21, 2012

Related U.S. Application Data

(63) Continuation of application No. PCT/CN2010/076349, filed on Aug. 25, 2010.

(30) Foreign Application Priority Data

Sep. 7, 2009    (CN) .......................... 2009 1 0190043

(51) Int. Cl.
*H04L 29/00* (2006.01)
(52) U.S. Cl.
USPC .............................................. 726/3; 713/155
(58) Field of Classification Search
USPC .............................................. 713/155; 726/3
See application file for complete search history.

(56) References Cited

U.S. PATENT DOCUMENTS 7,434,044 B2 * 10/2008 Halasz et al. ................. 713/155
7,458,095 B2    11/2008 Forsberg 2004/0085942 A1    5/2004 Le et al.
2004/0105431 A1    6/2004 Monjas-Llorente
2004/0148504 A1    7/2004 Forsberg

FOREIGN PATENT DOCUMENTS

| CN | 1491012 A | 4/2004 |
|---|---|---|
| CN | 1859336 A | 11/2006 |
| CN | 101043401 A | 9/2007 |

(Continued)

OTHER PUBLICATIONS

International Search Report and Written Opinion of the International Searching Authority issued in corresponding PCT Patent Application No. PCT/CN2010/076349, mailed Dec. 2, 2010, 7 pages.

(Continued)

*Primary Examiner* — Brandon Hoffman
*Assistant Examiner* — Michael D Anderson
(74) *Attorney, Agent, or Firm* — Brinks Gilson & Lione

(57) ABSTRACT

The present disclosure relates to a method, an apparatus and a system for updating an Authentication, Authorization and Accounting AAA session. The method includes: receiving an AAA session request sent by a second network access server, where the AAA session request includes a second session identifier and an ERP message; and updating a session according to the second session identifier and a stored first session identifier after successful user authentication that is performed according to the ERP message, where the first session identifier and the second session identifier correspond to the same user. As the session is updated according to the second session identifier and the stored first session identifier, synchronization of session information is ensured, thereby resolving an abnormal session problem that occurs when a home AAA server initiates a session or the network access server uses a session after re-authentication.

9 Claims, 8 Drawing Sheets

(56) References Cited

FOREIGN PATENT DOCUMENTS

| CN | 101079705 A | 11/2007 |
|---|---|---|
| CN | 101141265 A | 3/2008 |
| EP | 1796342 A1 | 6/2007 |
| KR | 20040098586 A | 11/2004 |

OTHER PUBLICATIONS

Extended European Search Report issued in corresponding European Patent Application No. 10813326.5, mailed Sep. 20, 2012, 6 pages.

Decugis, "Diameter Support for EAP Re-Authentication Protocol (ERP)" Diameter Maintenance and Extensions Internet Draft, Jun. 8, 2009, 18 pages.

Decugis, "Re: [Dime] Session-ID in draft-sdecugis-dime-diameter-erp-01" Diameter Maintenance and Extensions Working Group, Jun. 30, 2009, 2 pages.

Qin Wu, "Re: [Dime] Session-ID in draft-sdecugis-dime-diameter-erp-01" Diameter Maintenance and Extensions Working Group, Jun. 30, 2009, 3 pages.

Calhoun et al., "Diameter Base Protocol" Network Working Group, Sep. 2003, 147 pages.

Decugis, Ed., "Diameter Support for EAP Re-authentication Protocol (ERP)" Diameter Maintenance and Extensions, Jun. 8, 2009, 16 pages.

Aboba et al., Extensible Authentication Protocol (EAP) Network Working Group, Jun. 2004, 135 pages.

Dondeti et al., "Diameter Support for EAP Re-Authentication Protocol (ERP)" Diameter Maintenance and Extensions, Aug. 28, 2009, 37 pages.

Narayanan et al., "EAP Extensions for EAP Re-Authentication Protocol" Network Working Group, Aug. 2008, 87 pages.

Office action issued in correspond Chinese application No. 200910190043.X, dated Feb. 5, 2013, and an English translation thereof, total 15 pages.

Office action issued in correspond European application No. 10813326.5, dated Mar. 21, 2013, total 4 pages.

\* cited by examiner

METHOD, APPARATUS AND SYSTEM FOR UPDATING AUTHENTICATION, AUTHORIZATION AND ACCOUNTING SESSION

CROSS-REFERENCE TO RELATED APPLICATIONS

This application is a continuation of International Application No. PCT/CN2010/076349, filed on Aug. 25, 2010, which claims priority to Chinese Patent Application No. 200910190043.X, filed on Sep. 7, 2009, both of which are hereby incorporated by reference in their entireties.

FIELD

The present disclosure relates to the field of network communications, and in particular, to a method, an apparatus and a system for updating an Authentication, Authorization and Accounting session.

BACKGROUND

With the development and progress of networks, user terminals become more intelligent, and have more functions. A terminal may not only access a mobile network, for example, a third generation mobile communication technology (3G) network, a Wireless Local Access Network (WLAN), or a Worldwide Interoperability for Microwave Access (WiMAX) network, move in a home network thereof, or roam to a network of another operator; but may also access a fixed network, for example, access based on a Digital Subscriber Line (DSL) or an optical fiber. However, no matter for the mobile access or the fixed access, and regardless of roaming or not, when a terminal intends to access a network and use various services provided by an operator, the network side performs an Authentication, Authorization and Accounting (AAA) process on the terminal, that is, first performs network access authentication on the user to verify validity of an identity of the user; after the authentication is completed, grants a corresponding authority to the user according to a type of a service applied for by the user; and finally, generates accounting information according to a condition about resources occupied/used by the user.

An AAA system architecture where a user moves to a visited network (Visited Network) and is connected to a home network through the visited network may be referred to as an AAA framework (AAA framework). The AAA framework includes an AAA client, an AAA proxy and a home AAA server. The AAA client is a network access server (NAS) located in a user access network, for example, a broadband remote access server (BRAS) device in a fixed network, or an access point (AP) device in a mobile network. The AAA proxy is an entity for processing an AAA protocol and forwarding an AAA message between the AAA client and the AAA server, and a local AAA server of the visited network or another intermediate network generally serves as the AAA proxy. The home AAA server and the local AAA server serving as the AAA proxy may be independent devices, or may be co-located with another entity.

In the AAA framework, the AAA entities interact with each other by using the AAA protocol. The AAA protocol may be a Remote Authentication Dial In User Service (RADIUS) protocol or a Diameter (Diameter) protocol. According to different protocols used, the AAA server may also be referred to as a Radius server, a Diameter server, and so on, and the names of the AAA client and the AAA proxy may also change similarly.

Similar to the AAA framework, an architecture where a user and a network perform mutual authentication may be referred to as an Extensible Authentication Protocol (EAP) framework (EAP framework). The EAP framework includes a user, an authenticator (Authenticator) and a home EAP server.

The user is a user terminal device that needs to access a network and access a network service, and has EAP authentication related protocol software (for example, EAPoL, that is, EAP over LAN).

The authenticator is a device for controlling physical access according to an authentication state of the user, and serves as a proxy between the user and an authentication server. The authenticator communicates with the user through a lower layer (for example, the EAPoL protocol), and for communication between the authenticator and the home EAP server, the EAP is borne on the AAA protocol (Diameter or Radius) or another upper layer protocol, and reaches the home EAP server after passing through a complex network. Finally, whether a port of the user is available is controlled according to an authentication result. The authenticator may be co-located with or be separated from the AAA client, and is generally located on a border gateway device, for example, the BRAS device or the AP device as described above.

The home EAP server is also referred to as a back-end server, performs authentication on the user, and after the authentication is successful, grants an authority of accessing a subscribed service, and the home EAP server is generally the home AAA server.

To save an authentication latency time, on the basis of the EAP authentication framework, an EAP Re-authentication Protocol (ERP) is proposed, which is implemented through the user and an EAP Re-authentication ER) server. The re-authentication mechanism basically includes two parts, namely, an ERP start process and a re-authentication process. The ERP start process is used for deriving a root key specific to a local domain from a root key shared between the user and the home EAP server after the user performs the EAP authentication, and sending the root key specific to the local domain to the ER server, so that the user may perform re-authentication with the ER server, without a need of going back to the home EAP server for authentication.

However, when the user moves to a new authenticator to perform re-authentication, the new authenticator reinitiates a new session for the user, and a session identifier of the new session is not updated by the home AAA server of the user, resulting in that what is maintained by the home AAA server is not the latest session of the user. When the home AAA server initiates a session refreshing or session termination (for example, user defaulting) or the network access server uses a session, the home AAA server does not operate the latest session of the user, resulting in an abnormal session and affecting the refreshing or termination of the service.

SUMMARY

Objectives of embodiments of the present disclosure are to provide a method, an apparatus and a system for updating an Authentication, Authorization and Accounting session, so as to resolve an abnormal session problem that occurs when a home AAA server sends a session or a network access server uses a session after re-authentication.

The objectives of the embodiments of the present disclosure are achieved through the following technical solutions:

A method for updating an Authentication, Authorization and Accounting (AAA) session in a network system comprising a first and second network access servers. The method includes: receiving an AAA session request sent by a second network access server, where the AAA session request includes a second session identifier and an EAP Re-authentication Protocol (ERP) message; and updating a session according to the second session identifier and a stored first session identifier after successful user authentication that is performed according to the ERP message, where the first session identifier and the second session identifier correspond to the same user.

An apparatus for updating an AAA session in a network system comprising a first and second network access servers. The apparatus includes: a first receiving unit, configured to receive an AAA session request sent by a second network access server, where the AAA session request includes a second session identifier and an ERP message; and an update unit, configured to update a session according to the second session identifier and a stored first session identifier after successful user authentication that is performed according to the ERP message, where the first session identifier and the second session identifier correspond to the same user.

A network system for updating an AAA session includes a second network access server and a local server, where the second network access server is configured to send a new AAA session request to the local server when a user moves to the second network access server, where a session identifier of the AAA session request is a second session identifier, and the AAA session request includes an ERP message; and the local server is configured to receive the AAA session request that is sent by the second network access server and carries the second session identifier, and update a session according to the second session identifier and a stored first session identifier after successful user authentication that is performed according to the ERP message, where the first session identifier and the second session identifier correspond to the same user.

By adopting the technical solutions provided in the embodiments of the present disclosure, as the session is updated according to the second session identifier and the stored first session identifier, synchronization of session information is ensured, thereby resolving the abnormal session problem that occurs when the home AAA server initiates a session or the network access server uses a session after re-authentication.

BRIEF DESCRIPTION OF THE DRAWINGS

To illustrate the technical solutions according to the embodiments of the present disclosure or in the prior art more clearly, the accompanying drawings required for describing the embodiments or the prior art are introduced below briefly. Apparently, the accompanying drawings in the following descriptions merely show some of the embodiments of the present disclosure, and persons of ordinary skill in the art can obtain other drawings according to the accompanying drawings without creative efforts.

DETAILED DESCRIPTION OF THE EMBODIMENTS

In order to make the objectives, features, and advantages of the embodiments of the present disclosure more comprehensible, the embodiments of the present disclosure is described in further detail below through specific embodiments with reference to the accompanying drawings.

An embodiment of the present disclosure is described below with reference to FIG. 1.

Figure 1:
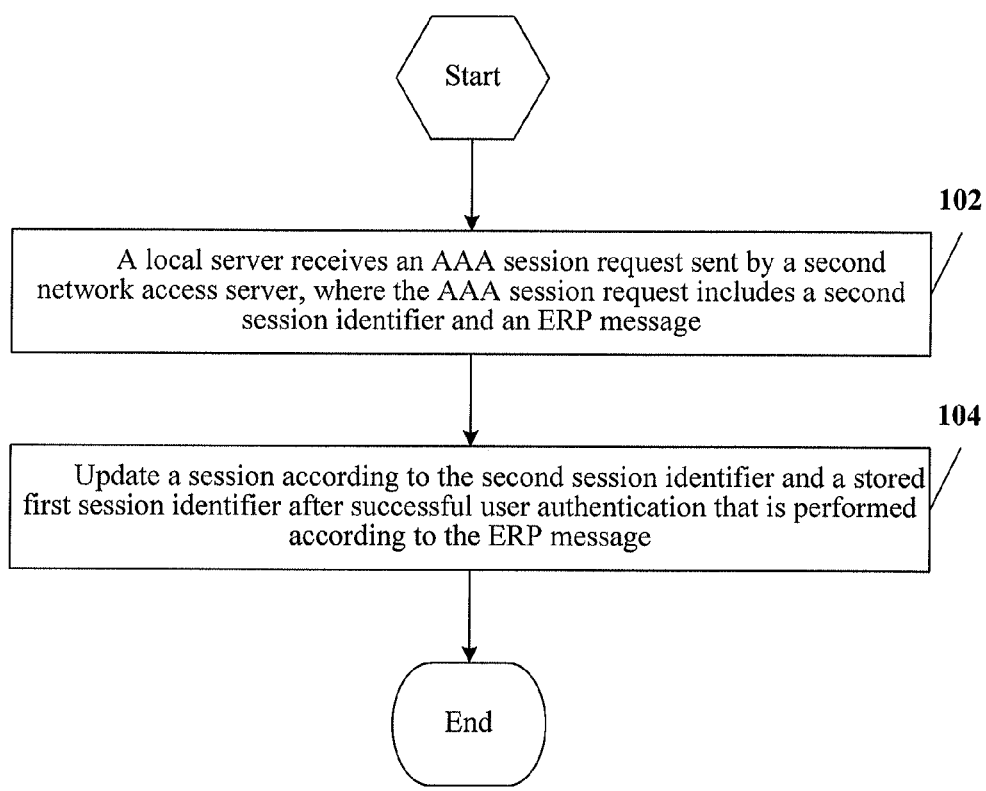
FIG. 1 is a flowchart of a method for updating an AAA session according to an embodiment of the present disclosure.

FIG. 1 is a flowchart of a method for updating an AAA session according to an embodiment of the present disclosure. The method includes:

102: A local server receives an AAA session request sent by a second network access server, where the AAA session request includes a second session identifier and an ERP message.

The second network access server may specifically be a BRAS device, an AP device, and so on, and the second network access server is not only an AAA client in an AAA framework, but is also an authenticator in an EAP framework, and serves as a proxy between a user and a home AAA server or the local server.

The local server may support an AAA protocol and an EAP re-authentication function at the same time, may be referred to as an ER server when the local server executes the re-authentication function, and may also be referred to as an AAA proxy, a local AAA server, and so on according to a role of the local server in the AAA framework. The local server may be located in a home network or a visited network.

When re-authentication is performed, for example, when the user moves to the second network access server from another network access server, the second network access server sends a new AAA session request to the local server, where a session identifier of the AAA session request is the second session identifier, and the AAA session request includes the ERP message.

104: Update a session according to the second session identifier and a stored first session identifier after successful user authentication that is performed according to the ERP message, where the first session identifier and the second session identifier correspond to the same user.

The local server processes the ERP message according to the EAP Re-authentication Protocol.

The first session identifier is a session identifier stored in the local server, and is generally a session identifier carried by a session that bears an EAP or ERP message when the user performs a full authentication (EAP) or re-authentication (ERP) start process last time, so the first session identifier and the second session identifier correspond to the same user.

The local server may update a session in different manners, for example, associate the first session identifier with the second session identifier, so that the local server is capable of performing session identifier replacement on a received session according to the association between the first session identifier and the second session identifier, or use the second session identifier to update the first session identifier, or use the first session identifier to update the second session identifier. When the manner of using the second session identifier to update the first session identifier or using the first session identifier to update the second session identifier is adopted, the local server further needs to instruct another entity to update session information synchronously. No matter which manner is adopted by the local server to update the session, the purpose is to ensure synchronization of session information between the local server and the home AAA server.

Another embodiment of the present disclosure is described below with reference to FIG. 2.

Figure 2:
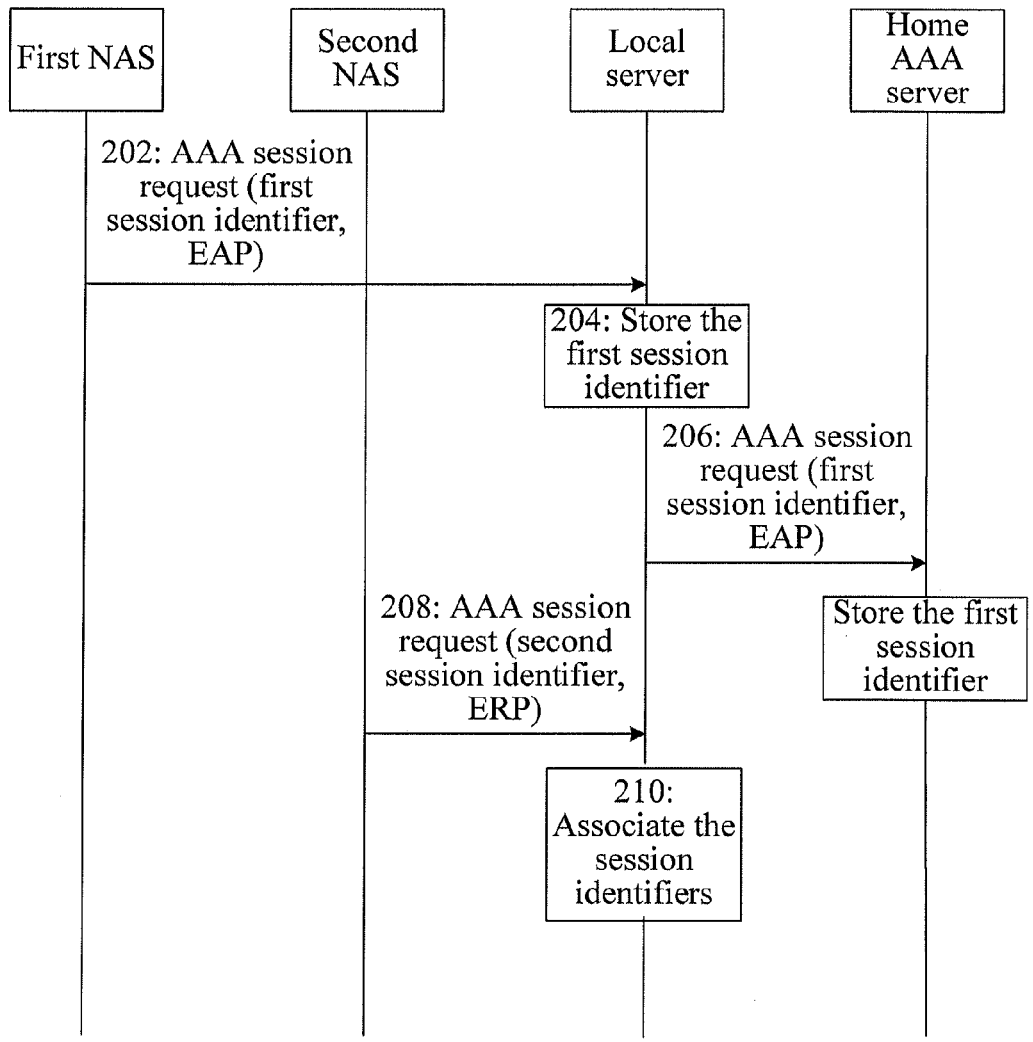
FIG. 2 is a flowchart of a method for updating an AAA session according to another embodiment of the present disclosure.

FIG. 2 is a flowchart of a method for updating an AAA session according to another embodiment of the present disclosure. The method includes:

202: A local server receives an AAA session request sent by a first network access server to a home AAA server, where the AAA session request includes a first session identifier and an EAP message.

When a user is attached to the first network access server, the first network access server serves as an AAA client to send an AAA session request and assign a session identifier, that is, the first session identifier, to the AAA session request. In an EAP framework, the first network access server serves as an authenticator to send an EAP message to a home EAP server, where the EAP message is borne by an AAA session, and at this time, EAP full authentication is an application of an AAA protocol.

204: The local server stores the first session identifier.

The local server may also store other session information in an attribute value pair (Attribute Value Pair, AVP) manner, for example, an identifier of the user (for example, user name User-Name AVP), or session timeout (session-timeout AVP).

206: The local server forwards, to the home AAA server, the AAA session request including the first session identifier and the EAP message, so that the home AAA server stores the first session identifier after successful user authentication that is performed according to the EAP message.

After receiving the AAA session request, the home AAA server stores the first session identifier, and verifies the AAA session. The EAP message is extracted, and authentication and authorization are performed on the user terminal. After successful user authentication, the home AAA server returns an AAA session response carrying an EAP success message to the first network access server through the local server. In addition, the home AAA server performs subsequent processes such as key distribution and accounting authorization on a session having a session identifier being the first session identifier.

208: The local server receives an AAA session request sent by a second network access server, where the AAA session request includes a second session identifier and an ERP message.

When the user is attached to the second network access server, EAP re-authentication, that is, ERP authentication, is performed. The second network access server serves as an AAA client to send an AAA session request and assign a session identifier, that is, the second session identifier, to the AAA session request. In an EAP framework, the second network access server serves as an authenticator to send an ERP message to the local server, where the ERP message is borne by an AAA session, and at this time, the EAP re-authentication is an application of the AAA protocol.

210: After successful user authentication that is performed according to the ERP message, associate the first session identifier with the second session identifier, and perform session identifier replacement on a received session according to the association between the first session identifier and the second session identifier.

The local server extracts the ERP message, and performs authentication on the user terminal. After successful user authentication, the local server returns an AAA session response to the second network access server, where the AAA session response carries an ERP success message. In addition, the local server performs subsequent processes such as key distribution and accounting authorization on a session having a session identifier being the second session identifier. After successful user authentication, the local server associates the second session identifier in the AAA session request with the first session identifier stored in the local server, so as to ensure synchronization of session information between the local server and the home AAA server. After an AAA session carrying the first session identifier or the second session identifier is received, session identifier replacement is performed on the received session according to the association between the first session identifier and the second session identifier.

Persons of ordinary skill in the art should understand that, if at this time the user is attached to another network access server, only 208 and 210 need to be executed, where the second session identifier is a new session identifier assigned by the another network access server to the current AAA session request, and the local server associates the new session identifier with the first session identifier, that is, uses the new session identifier to update the session identifier originally associated with the first session identifier.

Still another embodiment of the present disclosure is described below with reference to FIG. 3.

Figure 3:
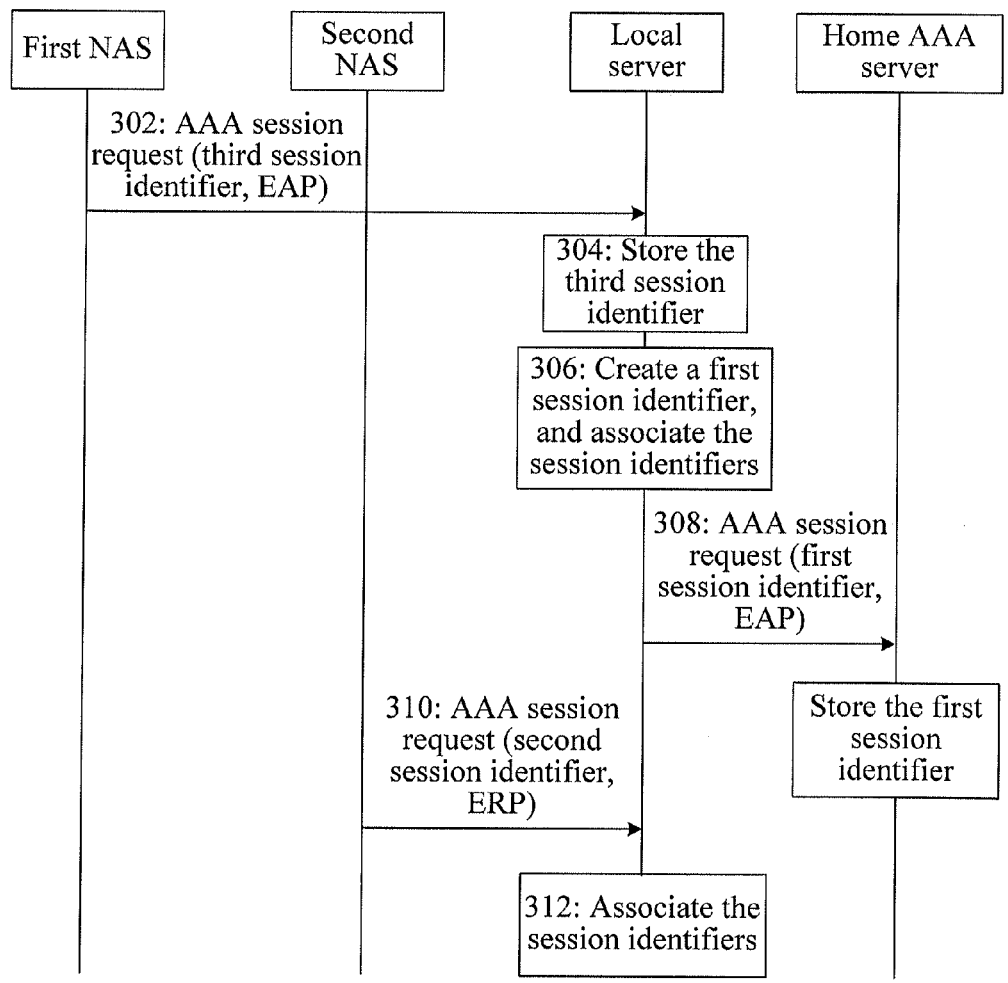
FIG. 3 is a flowchart of a method for updating an AAA session according to still another embodiment of the present disclosure.

FIG. 3 is a flowchart of a method for updating an AAA session according to still another embodiment of the present disclosure. The method includes:

302: A local server receives an AAA session request sent by a first network access server to a home AAA server, where the AAA session request includes a third session identifier and an EAP message.

When a user is attached to the first network access server, the first network access server serves as an AAA client to send an AAA session request and assign a session identifier, that is, the third session identifier, to the AAA session request. In an EAP framework, the first network access server serves as an authenticator to send an EAP message to a home EAP server, where the EAP message is borne by an AAA session, and at this time, EAP full authentication is an application of an AAA protocol.

304: The local server stores the third session identifier.

The local server may also store other session information in an AVP manner, for example, an identifier of the user (for example, user name User-Name AVP), or session timeout.

306: The local server creates a first session having a session identifier being a first session identifier, and associates the first session identifier with the third session identifier.

The local server creates an AAA session, that is, a first session, between the local server and the home AAA server, the first session may also be referred to as a virtual session, a session identifier of the virtual session is the first session identifier, and the local server associates the first session identifier with the third session identifier.

308: The local server uses the first session identifier to replace the third session identifier in the AAA session request sent by the first network access server, and forwards, to the AAA server, the AAA session request on which session identifier replacement is performed, so that the home AAA server stores the first session identifier after successful user authentication.

After receiving the AAA session request, the home AAA server stores the first session identifier, and verifies the AAA session. The EAP message is extracted, and authentication and authorization are performed on the user terminal. After successful user authentication, the home AAA server returns an AAA session response carrying an EAP success message to the first network access server through the local server. In addition, the home AAA server performs subsequent processes such as key distribution and accounting authorization on the session having a session identifier being the first session identifier. When receiving the AAA session response, the local server searches for a session association according to the session identifier in the AAA session response, that is, the first session identifier, to obtain the third session identifier, uses the third session identifier to replace the first session identifier in the AAA session response, and forwards the AAA session response to the first network access server. Likewise, the local server also performs replacement of the first session identifier with the third session identifier for an AAA session sent by the home AAA server during the subsequent processes such as key distribution and accounting authorization of the home AAA server; or performs replacement of the third session identifier with the first session identifier for an AAA session sent by the first network access server during the subsequent processes such as key distribution and accounting authorization. A process where the local server replaces a session identifier in a received AAA session with a session identifier associated with the session identifier may be referred to as session redirection.

310: The local server receives an AAA session request sent by a second network access server, where the AAA session request includes a second session identifier and an ERP message.

When the user is attached to the second network access server, EAP re-authentication, that is, ERP authentication, is performed. The second network access server serves as an AAA client to send an AAA session request and assign a session identifier, that is, the second session identifier, to the AAA session request. In an EAP framework, the second network access server serves as an authenticator to send an ERP message to the local server, where the ERP message is borne by an AAA session, and at this time, the EAP re-authentication is an application of the AAA protocol.

312: After successful user authentication that is performed according to the ERP message, associate the first session identifier with the second session identifier, and perform session identifier replacement on a received session according to the association between the first session identifier and the second session identifier.

After receiving the AAA session request, the local server extracts the ERP message, and performs authentication on the user terminal. After successful user authentication, the local server associates the second session identifier in the AAA session request with the first session identifier stored in the local server, that is, uses the second session identifier to update the third session identifier originally associated with the first session identifier, so as to ensure synchronization of session information between the local server and the home AAA server, and after receiving an AAA session carrying the first session identifier or the second session identifier, updates a session according to the association between the first session identifier and the second session identifier. After successful user authentication, the local server returns, to the second network access server, an AAA session response carrying the second session identifier and an ERP success message. In addition, the local server performs subsequent processes such as key distribution and accounting authorization on a session having a session identifier being the second session identifier.

Persons of ordinary skill in the art should understand that, if at this time the user is attached to another network access server, only 310 and 312 need to be executed, where the second session identifier is a new session identifier assigned by the another network access server to the current AAA session request, and the local server associates the new session identifier with the first session identifier, that is, uses the new session identifier to update the session identifier originally associated with the first session identifier.

Another embodiment of the present disclosure is described below with reference to FIG. 4.

Figure 4:
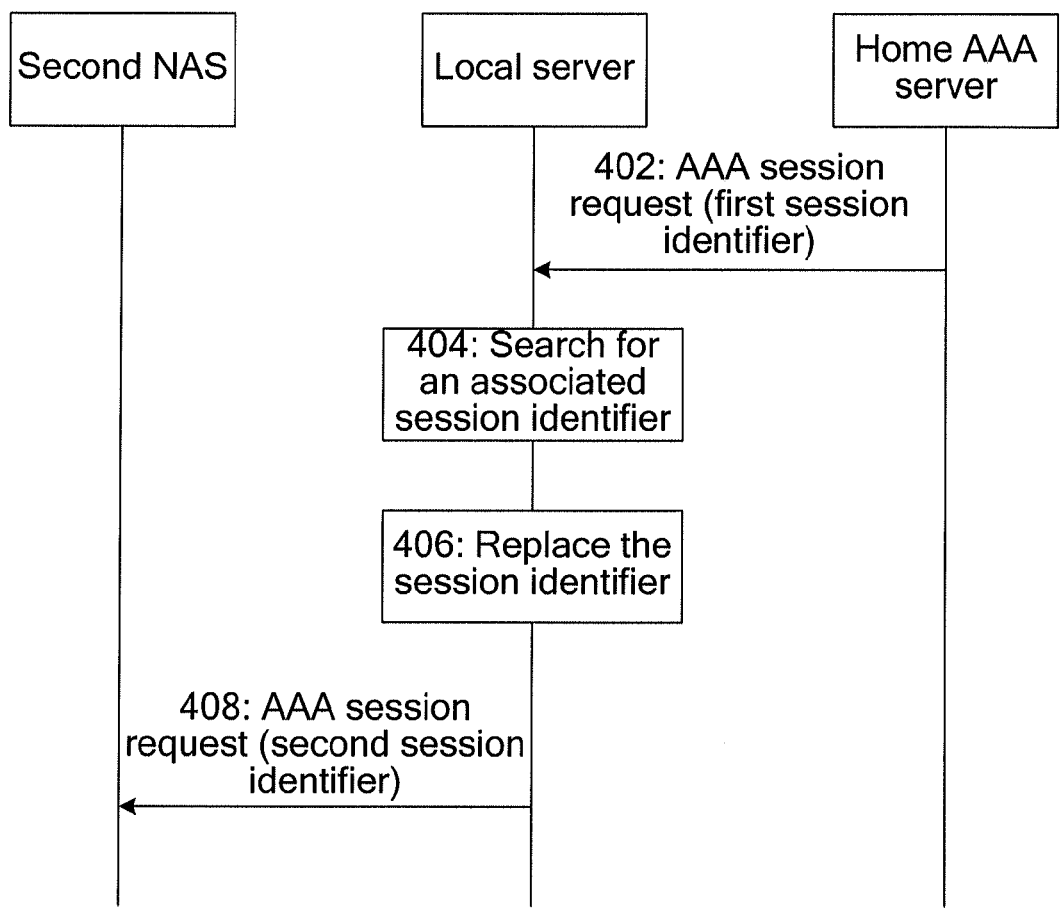
FIG. 4 is a flowchart of session identifier replacement according to another embodiment of the present disclosure.

FIG. 4 is a flowchart of session identifier replacement according to another embodiment of the present disclosure. The flow further illustrates the performing session identifier replacement on the received session according to the association between the first session identifier and the second session identifier in the embodiment shown in FIG. 2 or FIG. 3, which includes:

402: A local server receives an AAA session request sent by a home AAA server, where the AAA session request sent by the home AAA server carries a first session identifier.

The AAA session request sent by the home AAA server may be a session termination request or a session refreshing request. The first session identifier is a session identifier created by a first network access server or the local server during EAP full authentication. In the case of a session identifier created by the local server, the session identifier is a session identifier of a virtual session.

404: The local server searches for a second session identifier associated with the first session identifier according to the first session identifier.

406: The local server uses the second session identifier to replace the first session identifier in the AAA session request sent by the home AAA server, and forwards, to the second network access server, the AAA session request on which session identifier replacement is performed.

After receiving the AAA session request, the second network access server completes a subsequent response message processing process, and a user logging out or refreshing operation, with the AAA server and the local server. In the subsequent response message processing process, the local server performs replacement of the first session identifier with the second session identifier for an AAA session sent by the home AAA server, and performs replacement of the second session identifier with the first session identifier for an AAA session sent by the second network access server. A process where the local server replaces a session identifier in a received AAA session with a session identifier associated with the session identifier may be referred to as session redirection. If the AAA session request sent by the home AAA server is the session termination request, the local server may delete the first session identifier, the second session identifier and the association thereof after subsequent response message processing is completed.

Likewise, when the second network access server uses an AAA session in another application, for example, when the second network access server sends an accounting request to the home AAA server to request for accounting information of the user, or when the second network access server sends a session termination request to the home AAA server to request for terminating a user session, the local server also performs session redirection to replace the session identifier in the AAA session. At this time, the local server receives the AAA session request that is sent by the second network access server and carries the second session identifier, searches for the first session identifier associated with the second session identifier according to the second session identifier, uses the first session identifier to replace the second session identifier in the AAA session request sent by the second network access server, and forwards, to the AAA server, the AAA session request on which session identifier replacement is performed.

It can be seen that, by adopting the technical solution provided in the embodiment shown in FIG. 2 or FIG. 3 of the present disclosure, as the first session identifier and the second session identifier are associated, when the home AAA server sends a session or the network access server uses a session, the local server is capable of performing session identifier replacement on the received session according to the association between the first session identifier and the second session identifier, which ensures synchronization of session information between the local server and the home AAA server, thereby resolving an abnormal session problem that occurs when the home AAA server sends a session or the network access server uses a session after re-authentication.

Still another embodiment of the present disclosure is described below with reference to FIG. 5.

Figure 5:
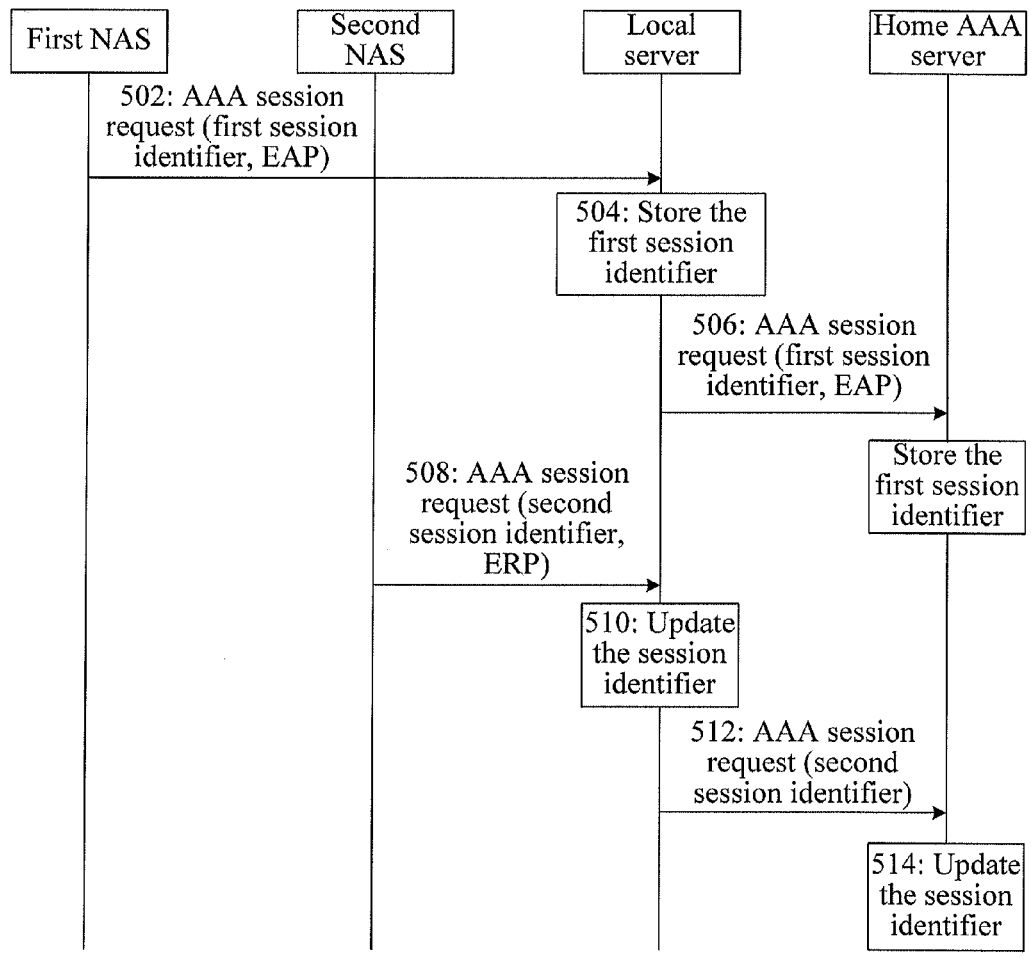
FIG. 5 is a flowchart of a method for updating an AAA session according to still another embodiment of the present disclosure.

FIG. 5 is a flowchart of a method for updating an AAA session according to still another embodiment of the present disclosure. The method includes:

502: A local server receives an AAA session request sent by a first network access server to a home AAA server, where the AAA session request includes a first session identifier and an EAP message.

When a user is attached to the first network access server, the first network access server serves as an AAA client to send an AAA session request and assign a session identifier, that is, the first session identifier, to the AAA session request. In an EAP framework, the first network access server serves as an authenticator to send an EAP message to a home EAP server, where the EAP message is borne by an AAA session, and at this time, EAP full authentication is an application of an AAA protocol.

504: The local server stores the first session identifier.

The local server may also store other session information in an AVP manner, for example, an identifier of the user (for example, user name User-Name AVP), or session timeout.

506: The local server forwards, to the home AAA server, the AAA session request including the first session identifier and the EAP message, so that the home AAA server stores the first session identifier after successful user authentication that is performed according to the EAP message.

After receiving the AAA session request, the home AAA server stores the first session identifier, and verifies the AAA session. The EAP message is extracted, and authentication and authorization are performed on the user terminal. After successful user authentication, the home AAA server returns an AAA session response carrying an EAP success message to the first network access server through the local server. In addition, the home AAA server performs subsequent processes such as key distribution and accounting authorization on a session having a session identifier being the first session identifier.

508: The local server receives an AAA session request sent by a second network access server, where the AAA session request includes a second session identifier and an ERP message.

When the user is attached to the second network access server, EAP re-authentication, that is, ERP authentication, is performed. The second network access server serves as an AAA client to send an AAA session request and assign a session identifier, that is, the second session identifier, to the AAA session request. In an EAP framework, the second network access server serves as an authenticator to send an ERP message to the local server, where the ERP message is borne by an AAA session, and at this time, the EAP re-authentication is an application of the AAA protocol.

510: After successful user authentication that is performed according to the ERP message, use the second session identifier to replace the first session identifier.

After receiving the AAA session request, the local server extracts the ERP message, and performs authentication on the user terminal. After successful user authentication, the local server updates the first session identifier stored in the local server to the second session identifier.

After successful user authentication, the local server returns an AAA session response carrying an ERP success message to the second network access server. In addition, the local server performs subsequent processes such as key distribution and accounting authorization on a session having a session identifier being the second session identifier.

512: The local server sends an AAA session request carrying the second session identifier to the home AAA server.

514: The home AAA server uses the second session identifier to update the first session identifier stored in the home AAA server.

After receiving the AAA session request sent by the local server, the home AAA server updates the first session identifier stored in the home AAA server to the second session identifier, so as to ensure synchronization of session information between the local server and the home AAA server. The AAA session request sent by the local server does not include the ERP message, the AAA session request inherits an existing application message, for example, an application message of the AAA session request sent by the second network access server, or defines a new application message, for example, an AAA session update message, the home AAA server needs to be upgraded in order to recognize the AAA session request, and the AAA session request and the response message thereof are protected by an existing secure connection between the local server and the home AAA server.

Persons of ordinary skill in the art should understand that, execution of 512 and 514 by the local server is independent of execution of other steps, and the two steps may be executed before, after or when the local server returns the AAA session response to the second network access server.

If at this time the user is attached to another network access server, only 508 to 514 need to be executed, where the second session identifier is a new session identifier assigned by the another network access server to the current AAA session request, and the local server uses the new session identifier to update the session identifier stored originally or updated in the previous ERP process, and sends the home AAA server an AAA session request carrying the new session identifier, so that the home AAA server uses the new session identifier to update the session identifier stored originally or updated in the previous ERP process.

It can be seen that, by adopting the technical solution provided in the embodiment shown in FIG. 5 of the present disclosure, as the second session identifier is used to update the first session identifier, when the home AAA server sends a session or the network access server uses a session, the latest session of the user is operated, which ensures the synchronization of session information between the local server and the home AAA server, thereby resolving an abnormal session problem that occurs when the home AAA server initiates a session or the network access server uses a session after re-authentication.

Another embodiment of the present disclosure is described below with reference to FIG. 6.

Figure 6:
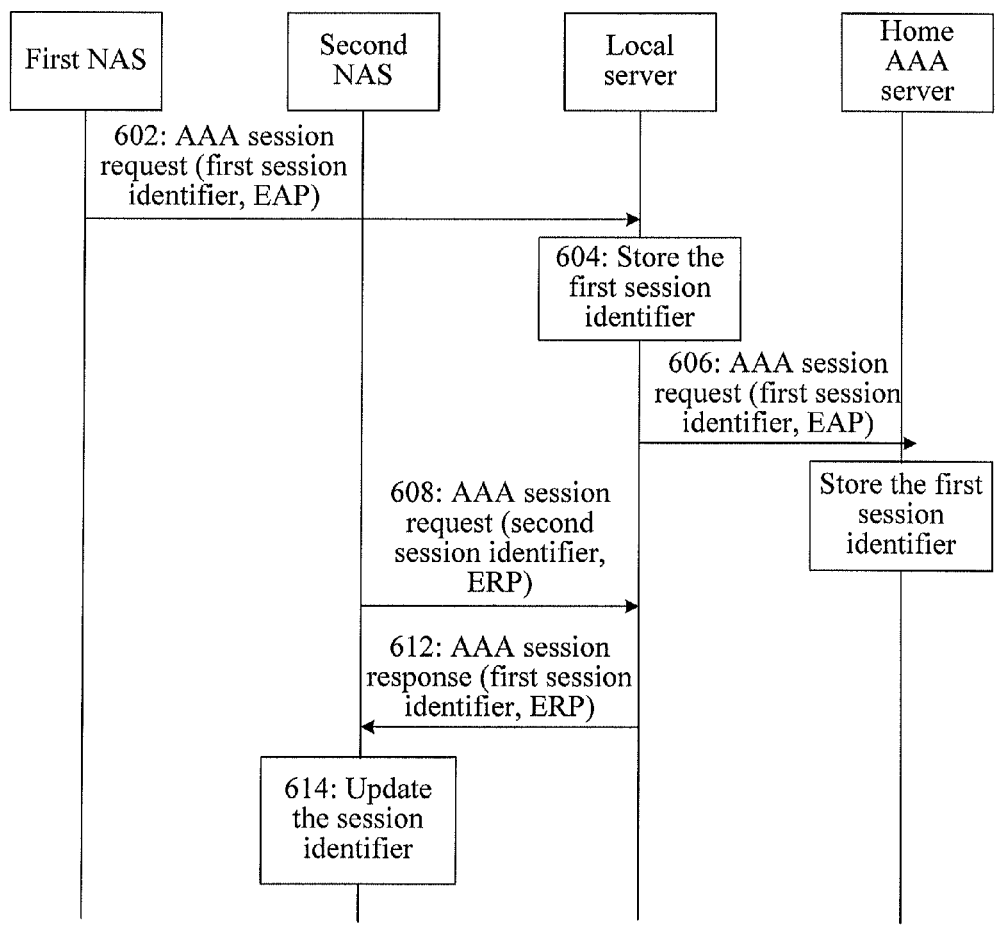
FIG. 6 is a flowchart of a method for updating an AAA session according to another embodiment of the present disclosure.

FIG. 6 is a flowchart of a method for updating an AAA session according to another embodiment of the present disclosure. The method includes:

602: A local server receives an AAA session request sent by a first network access server to a home AAA server, where the AAA session request includes a first session identifier and an EAP message.

When a user is attached to the first network access server, the first network access server serves as an AAA client to send an AAA session request and assign a session identifier, that is, the first session identifier, to the AAA session request. In an EAP framework, the first network access server serves as an authenticator to send an EAP message to a home EAP server, where the EAP message is borne by an AAA session, and at this time, EAP full authentication is an application of an AAA protocol.

604: The local server stores the first session identifier.

The local server may also store other session information in an AVP manner, for example, an identifier of the user (for example, user name User-Name AVP), or session timeout.

606: The local server forwards, to the home AAA server, the AAA session request including the first session identifier and the EAP message, so that the home AAA server stores the first session identifier after successful user authentication that is performed according to the EAP message.

After receiving the AAA session request, the home AAA server stores the first session identifier, and verifies the AAA session. The EAP message is extracted, and authentication and authorization are performed on the user terminal. After successful user authentication, the home AAA server returns an AAA session response carrying an EAP success message to the first network access server through the local server. In addition, the home AAA server performs subsequent processes such as key distribution and accounting authorization on a session having a session identifier being the first session identifier.

608: The local server receives an AAA session request sent by a second network access server, where the AAA session request includes a second session identifier and an ERP message.

When the user is attached to the second network access server, EAP re-authentication, that is, ERP authentication, is performed. The second network access server serves as an AAA client to send an AAA session request and assign a session identifier, that is, the second session identifier, to the AAA session request. In an EAP framework, the second network access server serves as an authenticator to send an ERP message to the local server, where the ERP message is borne by an AAA session, and at this time, the EAP re-authentication is an application of the AAA protocol.

610: After successful user authentication that is performed according to the ERP message, the local server sends an AAA session response to the second network access server according to the AAA session request, where the AAA session response carries the first session identifier.

The local server extracts the ERP message, and performs authentication and authorization on the user terminal. After successful user authentication, the local server returns an AAA session response to the second network access server, where the AAA session response carries the first session identifier, and carries an ERP success message. The local server does not change the stored first session identifier, so as to ensure synchronization of session information between the local server and the home AAA server. The local server performs subsequent processes such as key distribution and accounting authorization on the session having a session identifier being the first session identifier.

612: The second network access server uses the first session identifier to update the second session identifier according to the AAA session response.

The second network access server receives the AAA session response that carries the first session identifier and is sent by the local server, and then uses the first session identifier to update the second session identifier originally created by itself, so as to ensure synchronization of session information between the second network access server and the local server as well as the home AAA server.

Persons of ordinary skill in the art should understand that, if at this time the user is attached to another network access server, only 608 to 612 need to be executed, where the second session identifier is a new session identifier assigned by the another network access server to the current AAA session request, and the second network access server uses the first session identifier to update the new session identifier according to the AAA session response that is sent by the local server and carries the first session identifier.

Still another embodiment of the present disclosure is described below with reference to FIG. 7.

Figure 7:
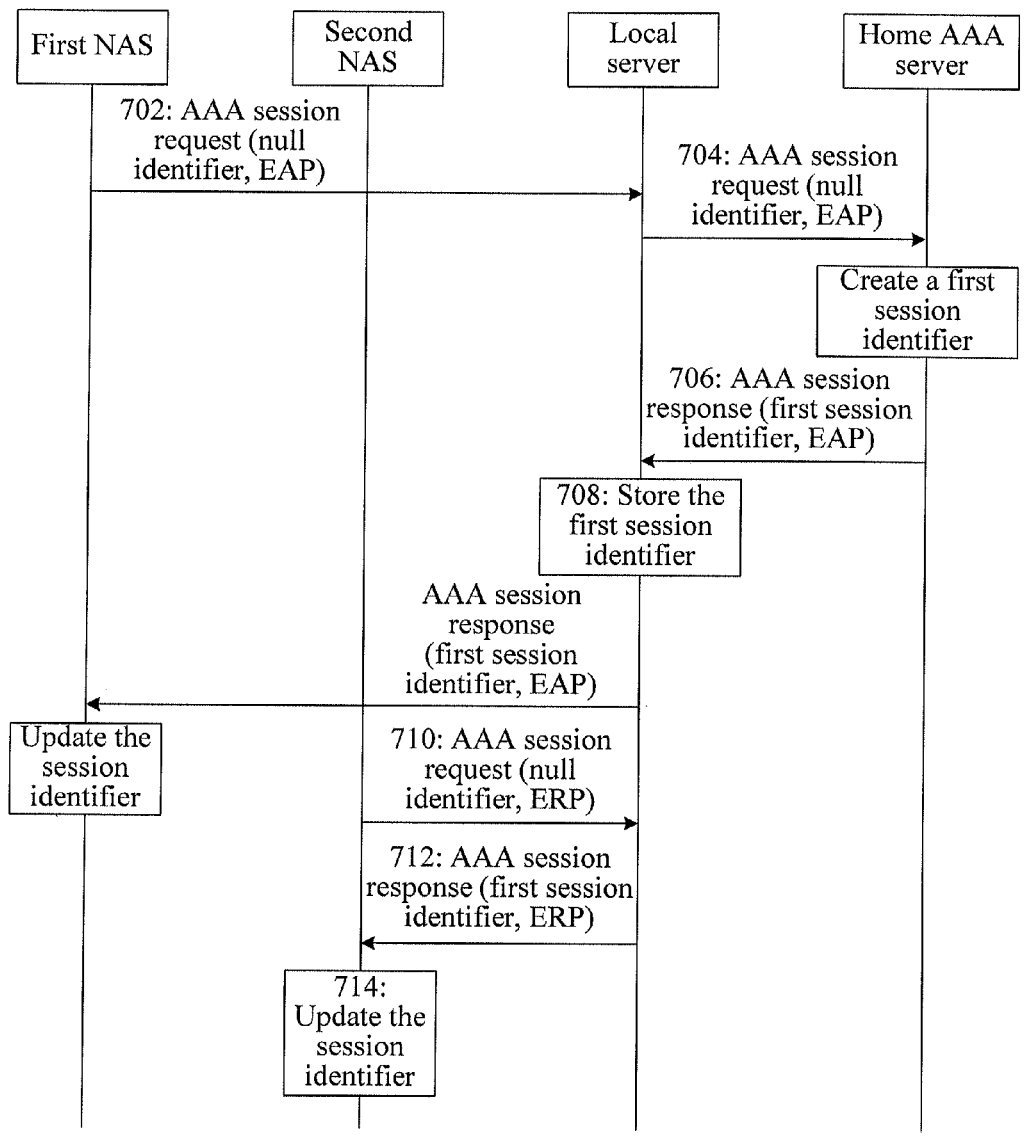
FIG. 7 is a flowchart of a method for updating an AAA session according to still another embodiment of the present disclosure.

FIG. 7 is a flowchart of a method for updating an AAA session according to still another embodiment of the present disclosure. The method changes the second session identifier to a null identifier on the basis of the embodiment shown in FIG. 6. The method includes:

702: A local server receives an AAA session request sent by a first network access server to a home AAA server, where the AAA session request includes a null identifier and an EAP message.

When a user is attached to the first network access server, the first network access server serves as an AAA client to send an AAA session request, where a session identifier of the AAA session request is a null identifier (null). In an EAP framework, the first network access server serves as an authenticator to send an EAP message to a home EAP server, where the EAP message is borne by an AAA session, and at this time, EAP full authentication is an application of an AAA protocol.

704: The local server forwards the AAA session request carrying the null identifier to the home AAA server, so that the home AAA server creates and stores a first session identifier after successful user authentication that is performed according to the EAP message.

After receiving the AAA session request, the home AAA server creates a session identifier, that is, the first session identifier, for the AAA session, stores the first session identifier, and verifies the AAA session. The home AAA server extracts the EAP message, and performs authentication and authorization on the user terminal. After successful user authentication, the home AAA server returns an AAA session response carrying an EAP success message to the first network access server through the local server. In addition, the home AAA server performs subsequent processes such as key distribution and accounting authorization on a session having a session identifier being the first session identifier.

706: The local server receives the AAA response message sent by the home AAA server to the first network access server, where the AAA response message includes the first session identifier and the EAP success message.

708: The local server stores the first session identifier.

The local server stores the first session identifier created by the home AAA server for the AAA session, and forwards the AAA response message to the first network access server, so that the first network access server uses the first session identifier to update the original null identifier, so as to ensure synchronization of session information between the first network access server and the local server as well as the home AAA server. The local server may also store other session information in an AVP manner, for example, an identifier of the user (for example, user name User-Name AVP), or session timeout.

710: The local server receives an AAA session request sent by a second network access server, where the AAA session request includes a second session identifier and an ERP message.

When the user is attached to the second network access server, EAP re-authentication, that is, ERP authentication, is performed. The second network access server serves as an AAA client to send an AAA session request, where a session identifier of the AAA session request is a null identifier, and the null identifier may be considered as the second session identifier. In an EAP framework, the second network access server serves as an authenticator to send an ERP message to the local server, where the ERP message is borne by an AAA session, and at this time, the EAP re-authentication is an application of the AAA protocol.

712: After successful user authentication that is performed according to the ERP message, the local server sends an AAA session response to the second network access server according to the AAA session request, where the AAA session response carries the first session identifier.

The local server extracts the ERP message, and performs authentication and authorization on the user. After successful user authentication, the local server returns an AAA session response to the second network access server, where the AAA session response carries the first session identifier, and carries an ERP success message. The local server does not change the stored first session identifier, so as to ensure synchronization of session information between the local server and the home AAA server. The local server performs subsequent processes such as key distribution and accounting authorization on the session having a session identifier being the first session identifier.

714: The second network access server uses the first session identifier to update the second session identifier according to the AAA session response.

The second network access server receives the AAA session response that is sent by the local server and carries the first session identifier, uses the first session identifier to update the second session identifier originally created by itself, and as the second session identifier is a null identifier, this step is equivalent to storing the first session identifier, so as to ensure synchronization of session information between the second network access server and the local server as well as the home AAA server.

Persons of ordinary skill in the art should understand that, if at this time the user is attached to another network access server, only 708 to 714 need to be executed, where the second session identifier is still a null identifier, and the second network access server uses the first session identifier to update the null identifier according to the AAA session response that is sent by the local server and carries the first session identifier, that is, stores the first session identifier.

It can be seen that, by adopting the technical solutions provided in the embodiments shown in FIG. 6 and FIG. 7 of the present disclosure, as the first session identifier is used to update the second session identifier, the first session identifier used during full authentication becomes a session identifier of the latest session of the user, so that when the home AAA server sends a session or the network access server uses a session, the latest session of the user is operated, which ensures the synchronization of session information between the network access server, the local server and the home AAA server, thereby resolving the abnormal session problem that occurs when the home AAA server initiates a session or the network access server uses a session after re-authentication.

Another embodiment of the present disclosure is described below with reference to FIG. 8.

Figure 8:
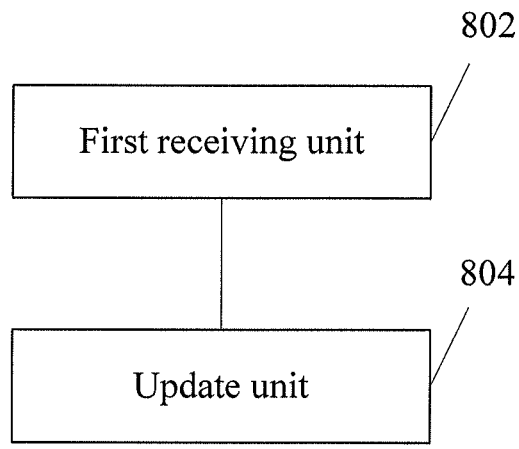
FIG. 8 is a block diagram of an apparatus for updating an AAA session according to another embodiment of the present disclosure.

FIG. 8 is a block diagram of an apparatus for updating an AAA session according to another embodiment of the present disclosure. The apparatus includes a first receiving unit 802, a processing unit 804 and an update unit 804.

The first receiving unit 802 is configured to receive an AAA session request sent by a second network access server, where the AAA session request includes a second session identifier and an ERP message.

The second network access server may specifically be a BRAS device, an AP device, and so on. The second network access server is not only an AAA client in an AAA framework, but is also an authenticator in an EAP framework, and serves as a proxy between a user and an authentication server.

When re-authentication is performed, for example, when the user moves to the second network access server from another network access server, the second network access server sends a new AAA session request, where a session identifier of the AAA session request is the second session identifier, and the AAA session request includes the ERP message. The first receiving unit 802 receives the AAA session request.

The update unit 804 is configured to update a session according to the second session identifier and a stored first session identifier after successful user authentication that is performed according to the ERP message, where the first session identifier and the second session identifier correspond to the same user.

The update unit 804 extracts the ERP message in the AAA session request received by the first receiving unit 802, and performs authentication on the user terminal.

The first session identifier is a session identifier stored in a local server, and is generally a session identifier carried by a session that bears an EAP or ERP message when the user performs a full authentication (EAP) or re-authentication (ERP) start process last time, so the first session identifier and the second session identifier correspond to the same user.

The update unit 804 may update a session in different manners, for example, associate the first session identifier with the second session identifier, so that the update unit 804 is capable of performing session identifier replacement on a received session according to the association between the first session identifier and the second session identifier, or use the second session identifier to update the first session identifier, or use the first session identifier to update the second session identifier.

When the update unit 804 updates the session by associating the first session identifier with the second session identifier, the update unit 804 includes:

an association module, configured to associate the first session identifier with the second session identifier, where after successful user authentication, the association module associates the second session identifier in the AAA session request with the first session identifier stored in the local server, so as to ensure synchronization of session information with a home AAA server;

a replacement module, configured to perform session identifier replacement on a received session according to the association between the first session identifier and the second session identifier, where the replacement module includes:

a second receiving unit, configured to receive an AAA session request sent by the home AAA server, where the AAA session request sent by the home AAA server carries the first session identifier, and the AAA session request sent by the home AAA server may be a session termination request or a session update request;

a search unit, configured to search for the second session identifier associated with the first session identifier according to the first session identifier; and a replacement unit, configured to use the second session identifier to replace the first session identifier in the AAA session request sent by the home AAA server, and forward, to the second network access server, the AAA session request sent by the home AAA server.

After receiving the AAA session request, the second network access server completes a subsequent response message processing process, and a user logging out or refreshing operation, with the AAA server and the local server. In the subsequent response message processing process, the replacement unit performs, according to a search result of the search unit, replacement of the first session identifier with the second session identifier for an AAA session sent by the home AAA server, and performs replacement of the second session identifier with the first session identifier for an AAA session sent by the second network access server. A process where the replacement unit replaces a session identifier in a received AAA session with a session identifier associated with the session identifier may be referred to as session redirection.

Likewise, when the second network access server uses an AAA session in another application, for example, when the second network access server sends an accounting request to the home AAA server to request for accounting information of the user, the replacement unit performs session redirection according to the search result of the search unit.

When the update unit 804 updates the session by using the first session identifier to update the second session identifier, the update unit 804 includes:

an update module, configured to use the second session identifier to update the first session identifier; and a sending module, configured to send the AAA session request carrying the second session identifier to the home AAA server, so that the home AAA server uses the second session identifier to update the first session identifier stored in the home AAA server.

After receiving the AAA session request sent by the sending module, the home AAA server updates the first session identifier stored in the home AAA server to the second session identifier, so as to ensure the synchronization of session information between the local server and the home AAA server. The AAA session request sent by the sending module does not include the ERP message, the AAA session request inherits an existing application message, for example, an application message of the AAA session request sent by the second network access server, or defines a new application message, for example, an AAA session update message, the home AAA server needs to be upgraded in order to recognize the AAA session request, and the AAA session request and the response message thereof are protected by an existing secure connection between the local server and the home AAA server.

When the update unit 804 updates the session by using the second session identifier to update the first session identifier, the update unit 804 is specifically configured to send an AAA session response to the second network access server according to the AAA session request, where the AAA session response carries the first session identifier, and the AAA session response enables the second network access server to use the first session identifier to update the second session identifier.

The update unit 804 returns an AAA session response to the second network access server, where the AAA session response carries the first session identifier, and carries an ERP success message. The second network access server receives the AAA session response that is sent by the update unit 804 and carries the first session identifier, uses the first session identifier to update the second session identifier originally created by itself, so as to ensure synchronization of session information between the second network access server and the local server as well as the home AAA server.

The apparatus may further include a third receiving unit, a storage unit, and a forwarding unit.

The third receiving unit is configured to receive an AAA session request sent by a first network access server to the home AAA server, where the AAA session request includes a first session identifier and an EAP message.

When the user is attached to the first network access server, the first network access server serves as an AAA client to send an AAA session request and assign a session identifier, that is, the first session identifier, to the AAA session request, and the third receiving unit receives the AAA session request. In an EAP framework, the first network access server serves as an authenticator to send an EAP message to a home EAP server, where the EAP message is borne by an AAA session, and at this time, EAP full authentication is an application of an AAA protocol.

The storage unit is configured to store the first session identifier.

The storage unit may also store other session information in an AVP manner, for example, an identifier of the user (for example, user name User-Name AVP), or session timeout.

The forwarding unit is configured to forward, to the home AAA server, the AAA session request including the first session identifier and the EAP message, so that the home AAA server stores the first session identifier after successful user authentication that is performed according to the EAP message.

After receiving the AAA session request, the home AAA server stores the first session identifier, and verifies the AAA session. The EAP message is extracted, and authentication and authorization are performed on the user terminal. After successful user authentication, the home AAA server returns an AAA session response carrying an EAP success message to the first network access server through the local server. In addition, the home AAA server performs subsequent processes such as key distribution and accounting authorization on a session having a session identifier being the first session identifier.

Still another embodiment of the present disclosure is described below with reference to FIG. 9.

Figure 9:
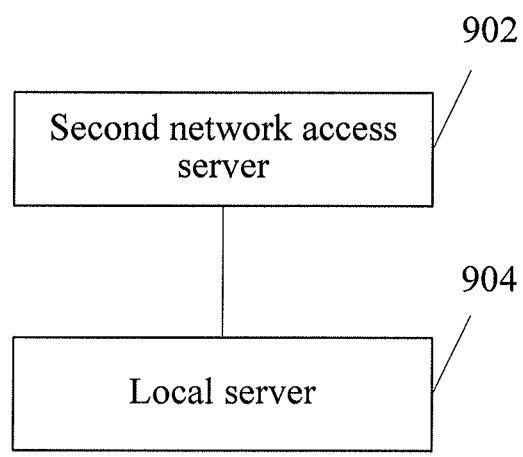
FIG. 9 is a block diagram of a system for updating an AAA session according to still another embodiment of the present disclosure.

FIG. 9 is a block diagram of a system for updating an AAA session according to still another embodiment of the present disclosure. The system includes a second network access server 902 and a local server 904.

The second network access server 902 is configured to send a new AAA session request to the local server 904 when a user moves to the second network access server, where a session identifier of the AAA session request is a second session identifier, and the AAA session request includes an ERP message.

The second network access server may specifically be a BRAS device, an AP device, and so on. The second network access server is not only an AAA client in an AAA framework, but is also an authenticator in an EAP framework, and serves as a proxy between a user and an authentication server.

When re-authentication is performed, for example, when the user moves to the second network access server 902 from another network access server, the second network access server 902 sends a new AAA session request, where a session identifier of the AAA session request is the second session identifier, and the AAA session request includes the ERP message.

The local server 904 is configured to receive the AAA session request that is sent by the second network access server 902 and carries the second session identifier, and update a session according to the second session identifier and a stored first session identifier after successful user authentication that is performed according to the ERP message, where the first session identifier and the second session identifier correspond to the same user.

The local server may support an AAA protocol and an EAP re-authentication function at the same time, may be referred to as an ER server when the local server executes the re-authentication function, and may also be referred to as an AAA proxy, a local AAA server, and so on according to a role of the local server in the AAA framework. The local server may be located in a home network or a visited network.

The first session identifier is a session identifier stored in the local server 904, and is generally a session identifier carried by a session that bears an EAP or ERP message when the user performs a full authentication (EAP) or re-authentication (ERP) start process last time, so the first session identifier and the second session identifier correspond to the same user.

The local server 904 may update a session in different manners, for example, associate the first session identifier with the second session identifier, so that the local server 904 is capable of performing session identifier replacement on a received session according to the association between the first session identifier and the second session identifier, or use the second session identifier to update the first session identifier, or use the first session identifier to update the second session identifier. When the manner of using the second session identifier to update the first session identifier or using the first session identifier to update the second session identifier is adopted, the local server 904 further needs to instruct another entity to update the session synchronously. No matter which manner is adopted by the local server 904 to update the session, the purpose is to ensure synchronization of session information between the local server 904 and the home AAA server.

By adopting the technical solutions provided in the embodiments of the present disclosure, as the session is updated according to the second session identifier and the stored first session identifier, the synchronization of session information between the local server and the home AAA server is ensured, thereby resolving the abnormal session problem that occurs when the home AAA server initiates a session or the network access server uses a session after re-authentication.

Persons of ordinary skill in the art should understand that, all of or a part of the steps in the methods according to the preceding embodiments may be implemented by a program instructing relevant hardware such as a processor. The program may be stored in a computer readable storage medium accessible to the processor. The storage medium may be a ROM/RAM, a magnetic disk or an optical disk.

The preceding descriptions are merely exemplary embodiments of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A method for updating an Authentication, Authorization and Accounting (AAA) session in a network system comprising a first and second network access servers, comprising:
   receiving an AAA session request sent by the second network access server, wherein the AAA session request comprises a second session identifier and an EAP Re-authentication Protocol (ERP) message; and
   updating a session according to the second session identifier and a stored first session identifier after successful user authentication that is performed according to the ERP message, wherein the first session identifier and the second session identifier correspond to a same user;
   wherein updating the session according to the second session identifier and the stored first session identifier comprises:
   associating the first session identifier with the second session identifier; and
   performing session identifier replacement on a received session according to the association between the first session identifier and the second session identifier;
   wherein before receiving the AAA session request carrying the second session identifier, the method further comprises:
   when a user is attached to the first network access server, receiving an AAA session request sent by the first network access server to the home AAA server, wherein the AAA session request comprises a third session identifier and an EAP message;
   storing the third session identifier;
   creating a first session having a session identifier being the first session identifier, and associating the first session identifier with the third session identifier; and
   using the first session identifier to replace the third session identifier in the AAA session request sent by the first network access server, and forwarding, to the AAA server, the AAA session request on which session identifier replacement is performed, so that the home AAA server stores the first session identifier after successful user authentication that is performed according to the EAP message.

2. The method according to claim 1, wherein performing session identifier replacement on the received session according to the association between the first session identifier and the second session identifier comprises:
   receiving an AAA session request sent by a home AAA server, wherein the AAA session request sent by the home AAA server carries the first session identifier;
   searching for the second session identifier associated with the first session identifier according to the first session identifier; and
   using the second session identifier to replace the first session identifier in the AAA session request sent by the home AAA server, and forwarding, to the second network access server, the AAA session request on which session identifier replacement is performed.

3. The method according to claim 1, wherein performing session identifier replacement on the received session according to the association between the first session identifier and the second session identifier comprises:
receiving the AAA session request that is sent by the second network access server and carries the second session identifier;
searching for the first session identifier associated with the second session identifier according to the second session identifier; and
using the first session identifier to replace the second session identifier in the AAA session request sent by the second network access server, and forwarding, to an home AAA server, the AAA session request on which session identifier replacement is performed.

4. The method according to claim 1, wherein before receiving the AAA session request sent by the second network access server, the method further comprises:
receiving an AAA session request sent by the first network access server to a home AAA server, wherein the AAA session request comprises a first session identifier and an EAP message;
storing the first session identifier; and
forwarding, to the home AAA server, the AAA session request comprising the first session identifier and the EAP message, so that the home AAA server stores the first session identifier after successful user authentication that is performed according to the EAP message.

5. The method according to claim 2, wherein before receiving the AAA session request sent by the second network access server, the method further comprises:
receiving an AAA session request sent by the first network access server to a home AAA server, wherein the AAA session request comprises a first session identifier and an EAP message;
storing the first session identifier; and
forwarding, to the home AAA server, the AAA session request comprising the first session identifier and the EAP message, so that the home AAA server stores the first session identifier after successful user authentication that is performed according to the EAP message.

6. A server for updating a session identifier of an Authentication, Authorization, and Accounting (AAA) session request, the server comprising:
a non-transitory memory storage;
one or more processors accessible to the non-transitory memory storage; and
one or more modules stored in the non-transitory memory storage and configured for execution by the one or more processors, the one or more modules including instructions:
to receive an AAA session request sent by the second network access server, wherein the AAA session request comprises a second session identifier and an EAP Re-authentication Protocol (ERP) message; and
to update a session according to the second session identifier and a stored first session identifier after successful user authentication that is performed according to the ERP message, wherein the first session identifier and the second session identifier correspond to a same user;
wherein to update the session according to the second session identifier and the stored first session identifier comprises:
to associate the first session identifier with the second session identifier; and
to perform session identifier replacement on a received session according to the association between the first session identifier and the second session identifier;
wherein to perform session identifier replacement on the received session according to the association between the first session identifier and the second session identifier comprises:
to receive an AAA session request sent by a home AAA server, wherein the AAA session request sent by the home AAA server carries the first session identifier;
to search for the second session identifier associated with the first session identifier according to the first session identifier; and
to use the second session identifier to replace the first session identifier in the AAA session request sent by the home AAA server, and to forward, to the second network access server, the AAA session request on which session identifier replacement is performed;
wherein before to receive the AAA session request carrying the second session identifier, the modules stored in the memory further comprises instructions:
when a user is attached to the first network access server, to receive an AAA session request sent by the first network access server to the home AAA server, wherein the AAA session request comprises a third session identifier and an EAP message;
to store the third session identifier;
to create a first session having a session identifier being the first session identifier, and to associate the first session identifier with the third session identifier; and
to use the first session identifier to replace the third session identifier in the AAA session request sent by the first network access server, and to forward, to the AAA server, the AAA session request on which session identifier replacement is performed, so that the home AAA server stores the first session identifier after successful user authentication that is performed according to the EAP message.

7. A method for updating a session identifier of an Authentication, Authorization, and Accounting (AAA) session request, executed by a server, the method comprising:
receiving, from a first network access server, a first AAA session request including a first session identifier;
receiving, from a second network access server, a second AAA session request including a second session identifier;
associating the first session identifier with the second session identifier;
receiving, a third AAA session request including the first session identifier;
obtaining the second session identifier associated with the first session identifier according to the first session identifier in the third AAA session request; and
replacing the first session identifier in the third AAA session request with the second session identifier.

8. The method according to claim 7, wherein the first session identifier and the second session identifier correspond to a same user.

9. A server for updating a session identifier of an Authentication, Authorization, and Accounting (AAA) session request, the server comprising:
a non-transitory memory storage;
one or more processors accessible to the non-transitory memory storage; and one or more modules stored in the non-transitory memory storage and configured for execution by the one or more processors, the one or more modules including instructions:
to receive, from a first network access server, a first AAA session request including a first session identifier;
to receive, from a second network access server, a second AAA session request including a second session identifier;
to associate the first session identifier with the second session identifier;
to receive, a third AAA session request including the first session identifier;
to obtain the second session identifier associated with the first session identifier according to the first session identifier in the third AAA session request; and
to replace the first session identifier in the third AAA session request with the second session identifier.

* * * * *